(12) United States Patent
Hariharasubrahmanian

(10) Patent No.: US 7,185,114 B1
(45) Date of Patent: Feb. 27, 2007

(54) VIRTUAL MEMORY SYSTEMS AND METHODS

(76) Inventor: Shrikumar Hariharasubrahmanian, 1381 S. East St., Amherst, MA (US) 01002

( * ) Notice: Subject to any disclaimer, the term of this patent is extended or adjusted under 35 U.S.C. 154(b) by 502 days.

(21) Appl. No.: 09/632,844

(22) Filed: Aug. 4, 2000

Related U.S. Application Data

(60) Provisional application No. 60/147,764, filed on Aug. 7, 1999.

(51) Int. Cl.
*G06F 15/16* (2006.01)
(52) U.S. Cl. ...................... 709/250; 711/100
(58) Field of Classification Search ........... 709/104, 709/203, 213–216, 219, 226, 238, 250; 714/4; 711/100
See application file for complete search history.

(56) References Cited

U.S. PATENT DOCUMENTS

| | | | |
|---|---|---|---|
| 5,084,877 A | | 1/1992 | Netravali et al. |
| 5,781,615 A | | 7/1998 | Bales et al. |
| 5,862,335 A | | 1/1999 | Welch, Jr. et al. ......... 395/200 |
| 5,884,028 A | * | 3/1999 | Kindell et al. ............. 709/234 |
| 5,901,334 A | * | 5/1999 | Banks et al. .................. 710/56 |
| 6,006,269 A | * | 12/1999 | Phaal ......................... 709/227 |
| 6,034,963 A | | 3/2000 | Minami et al. ............. 370/401 |
| 6,055,564 A | * | 4/2000 | Phaal ......................... 709/207 |
| 6,098,172 A | | 8/2000 | Coss et al. .................. 713/201 |
| 6,138,159 A | * | 10/2000 | Phaal ......................... 709/226 |
| 6,249,836 B1 | * | 6/2001 | Downs et al. .............. 710/268 |
| 6,288,790 B1 | * | 9/2001 | Yellepeddy et al. ....... 358/1.15 |
| 6,321,250 B1 | * | 11/2001 | Knape et al. ............... 709/203 |
| 6,360,270 B1 | * | 3/2002 | Cherkasova et al. ........ 709/229 |
| 6,438,652 B1 | * | 8/2002 | Jordan et al. ............... 711/120 |
| 6,467,040 B1 | * | 10/2002 | Apte et al. .................. 713/168 |
| 6,526,448 B1 | * | 2/2003 | Blewett ....................... 709/238 |
| 6,823,392 B2 | * | 11/2004 | Cherkasova et al. ........ 709/229 |

FOREIGN PATENT DOCUMENTS

WO WO99/52254 * 10/1999

OTHER PUBLICATIONS

Cardellini et al., "Redirection Algorithms for Load Sharing in Distributed Web-server Systems," Jun. 1999, Proceedings, 19th IEEE International Conference on Distributed Computing Systems, 1999, pp. 528-535.*
Internet Engineering Task Force, "Requirements for Internet Hosts—Communication Layers," RFC1122, Oct. 1989, pp. 1-115.

* cited by examiner

*Primary Examiner*—Glenton B. Burgess
*Assistant Examiner*—Sean Reilly
(74) *Attorney, Agent, or Firm*—Cesari and McKenna, LLP

(57) ABSTRACT

A network (100) includes a first communication device (110) and a second communication device (120). The first communication device (110) receives a first packet containing information for the first communication device (110) and determines whether adequate resources exist for handling the packet. When inadequate resources are determined to exist, the first communication device (110) generates a second packet, stores the information in the second packet, and transmits the second packet. The second communication device (120) receives the second packet, generates a third packet, transfers the information to the third packet, and transmits the third packet to the first communication device (110). The first communication device (110) receives the third packet and processes the information in the third packet.

55 Claims, 8 Drawing Sheets

| SOURCE PORT | DESTINATION PORT |
|---|---|
| SEQUENCE NUMBER ||
| ACKNOWLEDGE NUMBER ||
| HEADER LENGTH / RESERVED / FLAGS | WINDOW SIZE |
| CHECKSUM | URGENT POINTER |
| OPTIONS (E.G., TIMESTAMP OPTION) ||

VIRTUAL MEMORY SYSTEMS AND METHODS

RELATED APPLICATION

This application claims priority under 35 U.S.C. § 119(e) based on U.S. Provisional Application Ser. No. 60/147,764, filed Aug. 7, 1999, the disclosure of which is incorporated herein by reference.

FIELD OF THE INVENTION

The present invention relates generally to networks and, more particularly, to systems and methods that create a virtual memory in a communication network.

BACKGROUND OF THE INVENTION

Communication networks permit computer-related devices, such as personal computers, servers, laptops, personal digital assistants (PDAs), and other similar devices, to communicate with one another. Currently, common household appliances, such as refrigerators, microwaves, and the like, are being implemented with micro controllers and/or microcomputers that allow these appliances to communicate over a communication network, such as the Internet.

Sometimes, communications over these networks are governed by a packetization protocol and a corresponding packet exchange protocol that specify what the communication devices on the network must and must not do under different specific circumstances. These protocols are specified under the relevant standards, as applicable to the domains in which the communication devices operate.

Packetization and packet exchange protocols usually require that the communication devices involved in a communication process store and respond to packets in separate steps that require allocations of memory to hold and process one or more packets. A conventional technique used by a communication device includes receiving a packet, storing it in local memory, and processing it only after complete reception of the packet. This technique places a demand on the communication device to have a large enough local memory that can store the entire packet and any corresponding control information.

Some communication devices, such as mini-computers, micro-controllers, and microcomputers, lack sufficient resources to store one or more packets or perform necessary networking protocol procedures. To participate in communication over a packet communication network, these devices must often associate themselves as slave devices to one or more host computers that contain the resources to perform operations on their behalf. For example, the host computers may perform the networking protocol procedures on behalf of the slave devices, transmit information to other devices on behalf of the slave devices, and perform operations on the slave devices in response to requests by network devices with which the slave devices are communicating. Such arrangements can result in delays in the processing of the packets, lead to many practical difficulties, and increase the cost of connecting the devices to the communication network.

Therefore, there exists a need for systems and methods that allow devices having limited memory capacity to participate in network operations.

SUMMARY OF THE INVENTION

Systems and methods, consistent with the present invention, address this and other needs by providing mechanisms that permit communication devices with limited memory capacity to participate in network operations.

In accordance with the purpose of the invention as embodied and broadly described herein, a network is provided that includes a first communication device and a second communication device. The first communication device receives a first packet containing information for the first communication device, determines whether adequate resources exist for storing all or a part of the information, generates a second packet when inadequate resources are determined to exist, stores the information in the second packet, and transmits the second packet. The second communication device receives the second packet from the first communication device, generates a third packet, transfers the information to the third packet, and transmits the third packet to the first communication device. The first communication device receives the third packet containing the information, and processes the information in that packet.

In another implementation consistent with the present invention, a communication device is provided. The communication device includes a memory and a processor. The processor receives a first packet containing information for processing by the communication device and determines whether to store the information in the memory. When the information is not to be stored, the processor generates a second packet having multiple fields, stores the information from the first packet in at least one field of the second packet, and transmits the second packet. The communication device also receives, in response to transmitting the second packet, a third packet containing the information and processes the information.

In yet another implementation consistent with the present invention, a method for processing information in a communications network having first and second communication devices is provided. The method includes receiving a packet by the first communication device, the packet containing information for processing by the first communication device; determining whether adequate resources exist for storing all or a part of the packet; failing to acknowledge the packet when inadequate resources are determined to exist; retransmitting the packet to the first communication device; processing the information in the retransmitted packet when adequate resources are determined to exist.

In still another implementation consistent with the present invention, a communication device includes a memory and a processor. The processor receives a packet, determines whether resources exist for processing all or a part of the packet, purposefully fails to acknowledge the packet when inadequate resources are determined to exist, receives a retransmitted version of the packet, and processes the retransmitted version when adequate resources are determined to exist.

In a further implementation consistent with the present invention, a communication device includes a memory and a processor. The processor determines whether all or a part of information is needed at a current time, generates a packet having multiple fields when the information is not needed at the current time, stores the information in at least one field of the packet, transmits the packet to a second communication device, receives a different packet from the second communication device, the different packet containing the information, and processes the information in the different packet when the information is determined to be needed.

In yet a further implementation consistent with the present invention, a method for processing information in a communication network having a group of communication devices, includes receiving a first packet by a first communication device, storing information relating to a network connection between the first communication device and a second communication device in one or more fields of a second packet, transmitting the second packet to the second communication device, transferring the network connection information from the second packet to a third packet, transmitting the third packet to the first communication device, and processing the third packet.

In another implementation consistent with the present invention, a network includes a first communication device and a second communication device. The first communication device includes logic configured to receive a first packet, the first packet containing information for the first communication device, logic configured to determine whether adequate resources exist, logic configured to generate a second packet when inadequate resources are determined to exist, logic configured to store the information in the second packet, logic configured to transmit the second packet, logic configured to receive a third packet, the third packet containing the information, and logic configured to process the information. The second communication device includes logic configured to receive the second packet, logic configured to generate the third packet, logic configured to transfer the information to the third packet, and logic configured to transmit the third packet to the first communication device.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 5 illustrates an exemplary structure of a Transmission Control Protocol packet header;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods, consistent with the present invention, provide mechanisms by which a device, having a limited memory capacity, may participate in a communication network. The device uses fields in packets to store data and/or control information that is not currently needed by the device. The device stores the data and/or control information in one or more fields, such as a timestamp field, of the packets with the knowledge of how the data and/or control information will be manipulated (if at all) by the network peer to which the packets are transmitted. When response packets are returned by the network peer, the device may process the data and/or control information in those packets. By transferring data and/or control information over the network until it is needed, a virtual memory is created.

Exemplary Network

Figure 1:
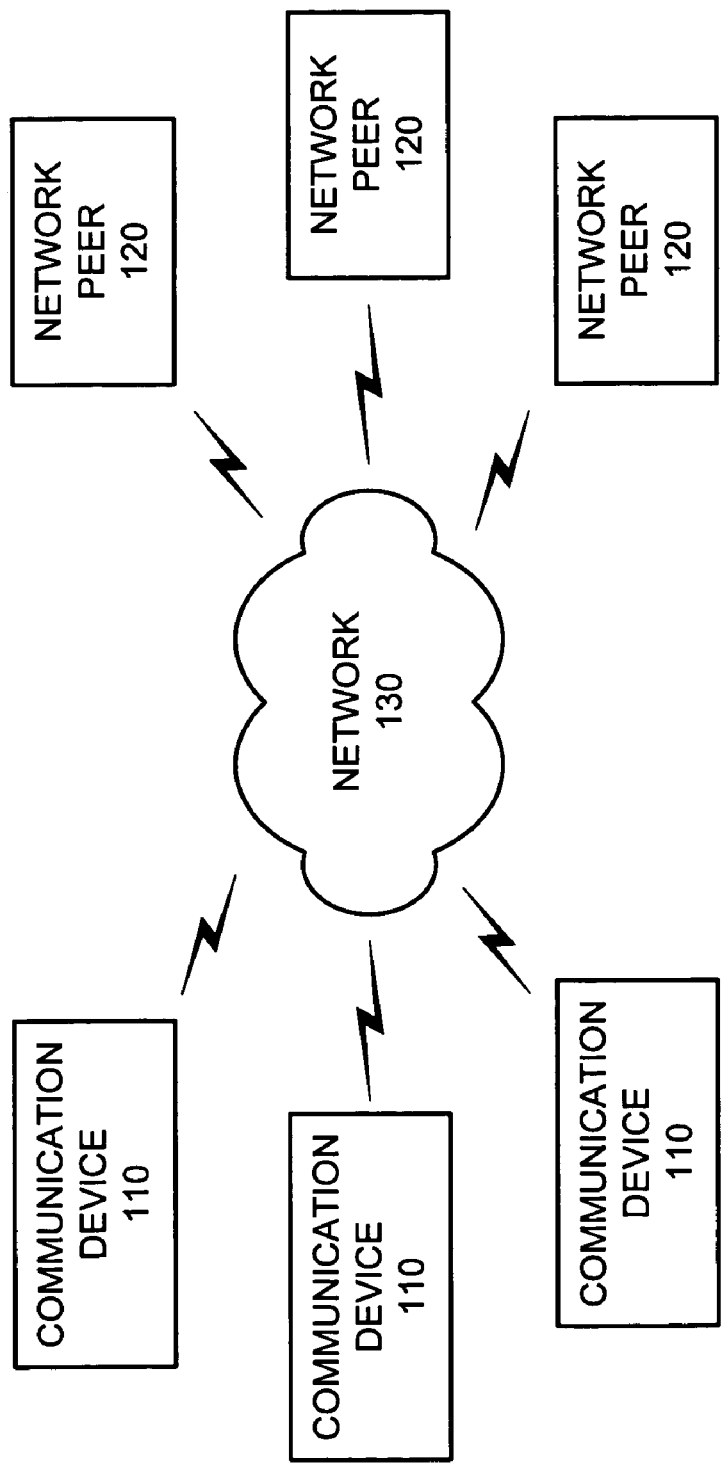
FIG. 1 illustrates an exemplary network consistent with the present invention.

FIG. 1 illustrates an exemplary network 100 consistent with the present invention. The network 100 may include communication devices 110 and network peers 120 connected to a network 130. Three communication devices 110 and three network peers 120 have been shown in FIG. 1 for simplicity. In practice, the network 100 may include more or less communication devices 110 and network peers 120.

The network 130 may include one or more data communication networks, such as the Internet, an intranet, a wide area network, or the like. In one implementation consistent with the present invention, the network 130 includes a packet-based network that operates according to a communications protocol, such as a Transmission Control Protocol and all related protocols, as specified in "Requirements for Internet Hosts—Communication Layers," RFC1122, October 1989.

The communication devices 110 may include computer devices, electronic devices, or similar devices with or without extensive computational and/or memory resources. The communication devices 110 may connect to the network 130 via wired, wireless, or optical communication paths. In one implementation consistent with the present invention, the communication devices 110 connect to the network 130 using a data link protocol, such as the Serial Line Internet Protocol (SLIP), Ethernet, or Token Ring.

The network peers 120 may include computer devices, such as personal computers, servers, laptops, personal digital assistants (PDAs), etc. that connect to the network 130 via wired, wireless, or optical communication paths. According to an implementation consistent with the present invention, the network peers 120 communicate with the communication devices 110 via data packetized communication in accordance with a conventional protocol, such as the Transmission Control Protocol or another related protocol. The network peers 120 may communicate with the communication devices 110 or other network peers 120 via a virtual circuit, connection, or socket through the network 130.

It will be appreciated that while the communication devices 110 and network peers 120 are illustrated as different devices, the communication devices 110 and network peers 120 may be similarly constructed. As a result, it will be further appreciated that any device described hereafter can play the role of a communication device 110 or network peer 120 at different times in the same communication session or in different communication sessions.

Exemplary Communication Device

Figure 2:
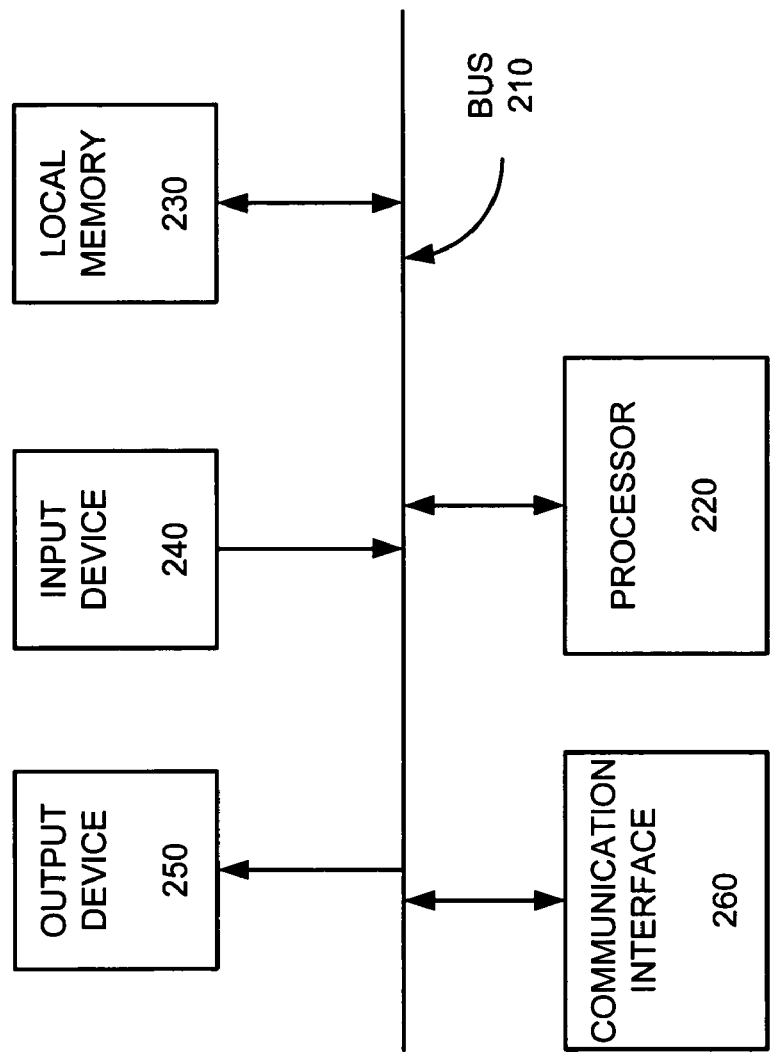
FIG. 2 illustrates an exemplary communication device configuration in an implementation consistent with the present invention.

FIG. 2 illustrates an exemplary communication device 110 configuration in an implementation consistent with the present invention. The communication device 110 may include a bus 210, a processor 220, a local memory 230, an input device 240, an output device 250, and a communication interface 260. The bus 210 may include one or more conventional buses that permit communication among the components of the communication device 110.

The processor 220 may be any type of conventional processor or microprocessor that interprets and executes instructions. The local memory 230 may be a large or small capacity memory device, such as a random access memory (RAM), a read only memory (ROM), or another type of dynamic or static storage device that stores information and instructions for processing by the processor 220. In one implementation consistent with the present invention, the local memory 230 includes a small capacity memory device capable of storing a small amount of information (e.g., less than or equal to the amount of information included in a typical packet).

The input device 240 may include any conventional mechanism that permits input of information into the communication device 110, such as a keyboard, a keypad, a mouse, data acquisition sensors, etc. The output device 250 may include any conventional mechanism that outputs information, including a display, a speaker, a transducer, an actuator, etc. The communication interface 260 may include any transceiver-like mechanism that enables the communication device 110 to communicate with other devices and systems. For example, the communication interface 260 may include mechanisms for communicating via a network, such as the network 130.

As will be described in detail below, a communication device 110 with insufficient resources, in an implementation consistent with the present invention, performs the necessary data packetization and transport protocol procedures for communicating over a network, such as network 130. The communication device 110 performs these tasks in response to processor 220 executing sequences of instructions contained in a computer-readable medium, such as the local memory 230. A computer-readable medium may include one or more memory devices and/or carrier waves.

The instructions may be read into memory 230 from another computer-readable medium or from another device via the communication interface 260. Execution of the sequences of instructions contained in local memory 230 causes processor 220 to perform processes that will be described later. Alternatively, hardwired circuitry may be used in place of or in combination with software instructions to implement processes consistent with the present invention. For example, the components of the communication device 110 may be fully implemented in silicon via a combination of logic gates. Thus, the present invention is not limited to any specific combination of hardware circuitry and software.

Exemplary Network Peer

Figure 3:
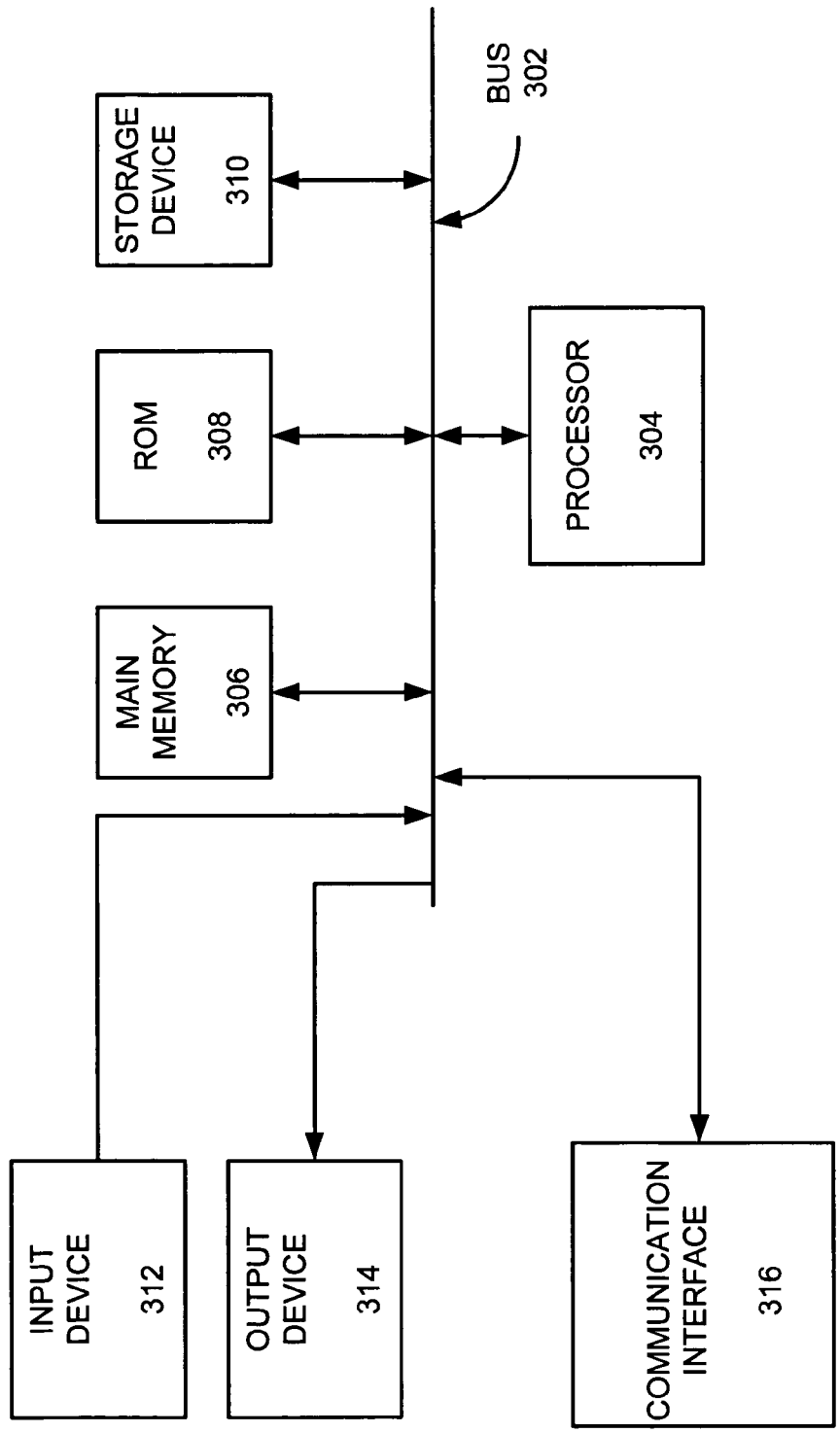
FIG. 3 illustrates an exemplary network peer configuration consistent with the present invention.

FIG. 3 illustrates an exemplary network peer 120 configuration consistent with the present invention. The exemplary network peer 120 includes a bus 302, a processor 304, a main memory 306, a read only memory (ROM) 308, a storage device 310, an input device 312, an output device 314, and a communication interface 316. The bus 302 may include one or more conventional buses that permit communication among the components of the network peer 120.

The processor 304 may include any type of conventional processor or microprocessor that interprets and executes instructions. The main memory 306 may include a random access memory (RAM) or another type of dynamic storage device that stores information and instructions for execution by the processor 304. Main memory 306 may also be used to store temporary variables or other intermediate information used during execution of instructions by processor 304.

ROM 308 may include a conventional ROM device and/or another type of static storage device that stores static information and instructions for processor 304. The storage device 310 may include a magnetic disk or optical disk and its corresponding drive and/or some other type of magnetic or optical recording medium and its corresponding drive for storing information and/or instructions.

The input device 312 may include any conventional mechanism that permits input of information into the network peer 120, such as a keyboard, a mouse, a microphone, a pen, data acquisition sensors, voice recognition and/or biometric mechanisms, etc. The output device 314 may include any conventional mechanism that outputs information, including a display, a printer, a transducer, an actuator, a speaker, etc.

The communication interface 316 may include any transceiver-like mechanism that enables the network peer 120 to communicate with other devices and/or systems, such as communication devices 110. For example, the communication interface 316 may include a modem or an Ethernet interface to a network. Alternatively, communication interface 316 may include other mechanisms for communicating via a communication network, such as network 130.

The network peer 120 performs the functions described below in response to processor 304 executing sequences of instructions contained in a computer-readable medium, such as memory 306. The instructions may be read into memory 306 from another computer-readable medium, such as a storage device 310, or from a separate device via communication interface 316. Execution of the sequences of instructions contained in memory 306 causes processor 304 to perform the process steps that will be described later. In alternative embodiments, hard-wired circuitry may be used in place of or in combination with software instructions to implement the present invention. For example, the components of the network peer 120 may be fully implemented in silicon via a combination of logic gates. Thus, the present invention is not limited to any specific combination of hardware circuitry and software.

Exemplary Processing

Figure 4:
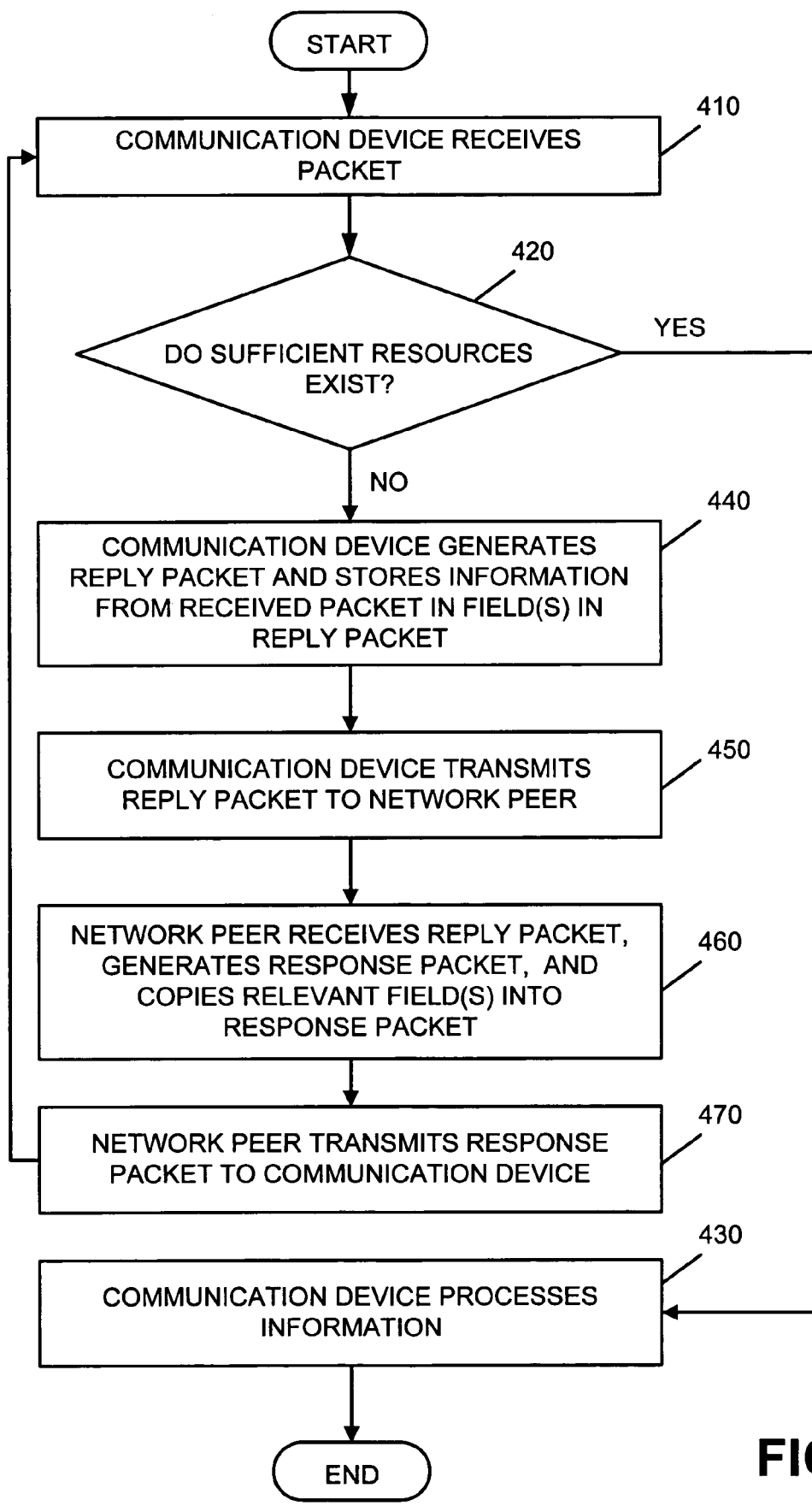
FIG. 4 illustrates an exemplary process, consistent with the present invention, that allows for operation of a communication device having limited memory resources.

FIG. 4 illustrates an exemplary process, consistent with the present invention, that allows a communication device having limited memory resources to participate in network operations. Processing begins with a communication device, such as communication device 110 in FIG. 1, receiving a packet via network 130 [step 410]. The packet may be received from a network peer, such as network peer 120 in FIG. 1, or another communication device 110. As described above, the communication device 110, in an implementation consistent with the present invention, may have very limited memory resources. As a result, the communication device 110 may be incapable of receiving an entire packet, or a significant portion of such a packet, into its memory 230 prior to analyzing and replying to the packet in accordance with the communication protocols implemented by the communication device 110.

Upon receipt of the packet, the communication device 110 determines whether adequate resources exist [step 420]. In making such a determination, the communication device 110 determines whether information in the packet can and should be stored at this time and whether the information can and should be processed at this time. The communication device 110 may determine that the information can not be stored at the present time if, for example, the communication device 110 currently lacks the memory capacity to store all or a portion of the information. The communication device 110 may determine that the information should not be stored at the present time if, for example, the information is not currently needed by the communication device 110, but will be needed at a later time. For example, the communication device 110 may determine that connection information and parameters related to the state of the connection itself should not be stored.

In determining whether the information can and should be processed at the present time, the communication device 110 may determine whether all or a portion of the information can be processed immediately. For example, the communication device 110 may determine whether its processor 220 is currently performing other tasks that may not allow for the information to be processed at the current time. The communication device 110 may also determine whether the information should be processed immediately or whether the information should be processed at a later time due, for example, to higher priority tasks currently being performed by the processor 220.

If the communication device 110 determines that adequate resources exist (i.e., that information in the packet can and should be stored/processed at the present time), the communication device 110 processes the information [step 430]. The processing may include the processor 220 using data and/or control information in the packet for performing one or more tasks.

If the communication device 110 determines that adequate resources do not exist (i.e., that the information can not or should not be stored or that the information can not or should not be processed immediately), the communication device 110 generates a packet [step 440]. The communication device 110 may store important information from the received packet or other information to be later used by the communication device 110 in the packet. The information may include, for example, connection details and/or other control information that pertain to one or more network connections, virtual circuits, or sockets with which the communication device 110 is currently involved. The information may also include data to be later used in one or more tasks performed by the communication device 110. In fact, the communication device 110 may store any information in the packet that is not currently needed by the communication device 110, but will be needed at a later time.

The communication device 110 may store the information anywhere in the packet that would not interfere with the normal processing of the packet and would allow for the later retransmission of the information from the network peer 120 to the communication device 110. For example, assuming that the communication device 110 and network peer 120 communicate using the Transmission Control Protocol, the communication device 110 may store the information in the Transmission Control Protocol header of the generated packet. It will be appreciated that while the following description assumes the use of the Transmission Control Protocol, other communication protocols may alternatively be used.

FIG. 5 illustrates an exemplary structure of a Transmission Control Protocol packet header 500. The Transmission Control Protocol packet header 500 includes a source port field, a destination port field, a sequence number field, an acknowledge number field, a header length field, a reserved field, a flags field, a window size field, a checksum field, an urgent pointer field, and an options field. The source port and destination port fields include data that identify the source and destination of a data packet. The sequence number field includes data that identifies the first byte of data in the packet. The acknowledge field includes data that identifies the next byte of data that the source expects to receive from the destination.

The header length field includes data that identifies the length of the header 500. The reserved field may be used for future expansions. The flags field may include several flags, such as Urgent, Acknowledge, Push, Reset, Synchronize, and Finish flags. The Urgent flag indicates whether the data in the urgent pointer field is valid. The Acknowledge flag indicates whether the data in the acknowledgement number field is valid. The Push flag indicates whether the accompanying data should be passed to the application at the destination in an expedited manner. The Reset flag indicates whether the connection should be reset. The Synchronize flag is used to establish an initial agreement on the sequence numbers. The Finish flag indicates whether the source has finished sending data.

The window size field includes data that identifies the amount of space the destination has available for storing unacknowledged data. The checksum field includes a checksum value that may cover both the header 500 and the data stored in the packet. The urgent pointer field includes data that identifies whether this packet should take priority over the normal data stream.

The options field may contain any number of predefined options. The options field may, for example, contain a timestamp option that allows for a round trip time between the source and destination to be determined. When using such an option, the source stores a timestamp value in the timestamp field. The destination copies the timestamp value, without interpreting it, into a return packet. Upon receipt of the return packet, the source may determine the round trip time by subtracting a current time from the timestamp value.

Assume that the communication device 110 stores information, such as from the received packet, instead of a timestamp value, in the timestamp field of the Transmission Control Protocol header 500 of the generated packet. Once the packet has been generated, the communication device 110 transmits the packet to a network peer, such as network peer 120 in FIG. 1 [step 450]. This network peer 120 may be the network peer 120 that transmitted the packet that was received in step 410 or it may be another network peer 120.

The network peer 120 receives the packet over network 130 [step 460]. Following the Transmission Control Protocol, the network peer 120 generates a response packet and copies the information from the timestamp field into a timestamp field of the response packet for transmission back to the communication device 110. It will be appreciated that if the communication device 110 stores the information in a field other than the timestamp field, the network peer 120 may manipulate the information when copying it to the response packet. If this occurs, the communication device 110 must know of the manipulation performed by the network peer 120 in order to convert the information back to its original form or to another usable form.

The network peer 120 transmits the response packet to the communication device 110 [step 470]. Upon receipt, the communication device returns to step 410 and processing repeats until the communication device 110 determines that sufficient resources exist [step 420]. When the communication device 110 determines that sufficient resources exist [step 420], the communication device 110 processes the information [step 430].

Figure 6:
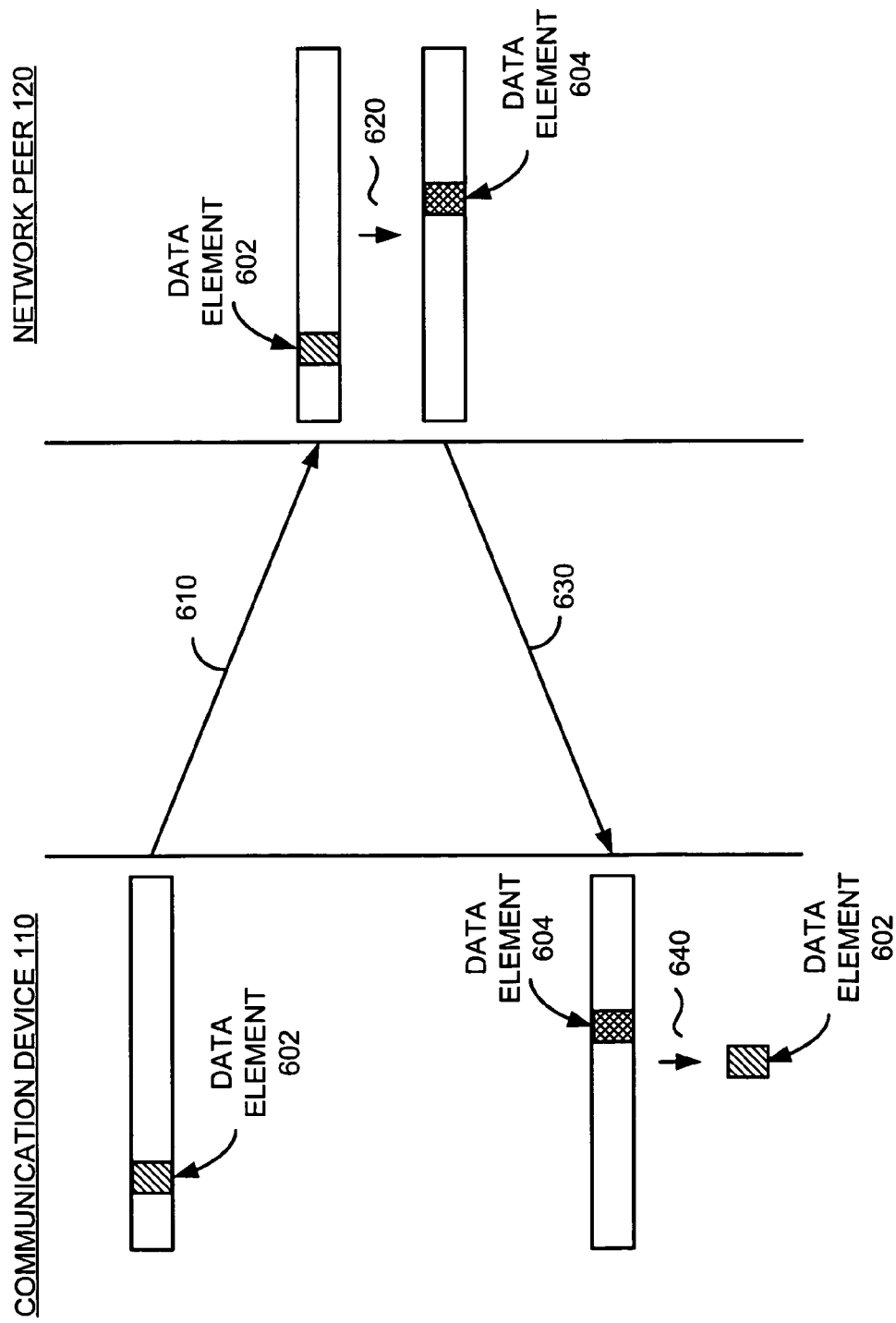
FIG. 6 illustrates an exemplary exchange of packets, consistent with the present invention, between a communication device and a network peer.

FIG. 6 illustrates an exemplary exchange of packets, consistent with the present invention, between a communication device 110 and a network peer 120. In FIG. 6, the communication device 110, having a limited memory capacity, requires a data element to be available for consultation and processing at a later point in time. Due to its limited memory capacity, the communication device 110 may be unable or unwilling to allocate memory to hold the value of the data element.

According to an implementation consistent with the present invention, the communication device 110 generates a packet and stores the data element 602 in one of the fields of the packet. The communication device 110 places the data element 602 in a field of the packet with foreknowledge of how the data element 602 will be processed (or manipulated) by the network peer 120. The communication device 110 then transmits the packet to the network peer [step 610].

The network peer 120 receives the packet containing the data element 602 and, in accordance with it predefined protocol steps, copies the data element (or a manipulated version thereof) 604 to a field of a reply packet [step 620]. The network peer 120 then transmits the reply packet to the communication device [step 630]. The communication device 110 receives the packet having the data element (or a manipulated version thereof) 604. Having foreknowledge of the manner in which the network peer 120 manipulated the data element 602, the communication device 110 may then convert the data element 604 back to its original form or some other usable form for processing [step 640].

Figure 7:
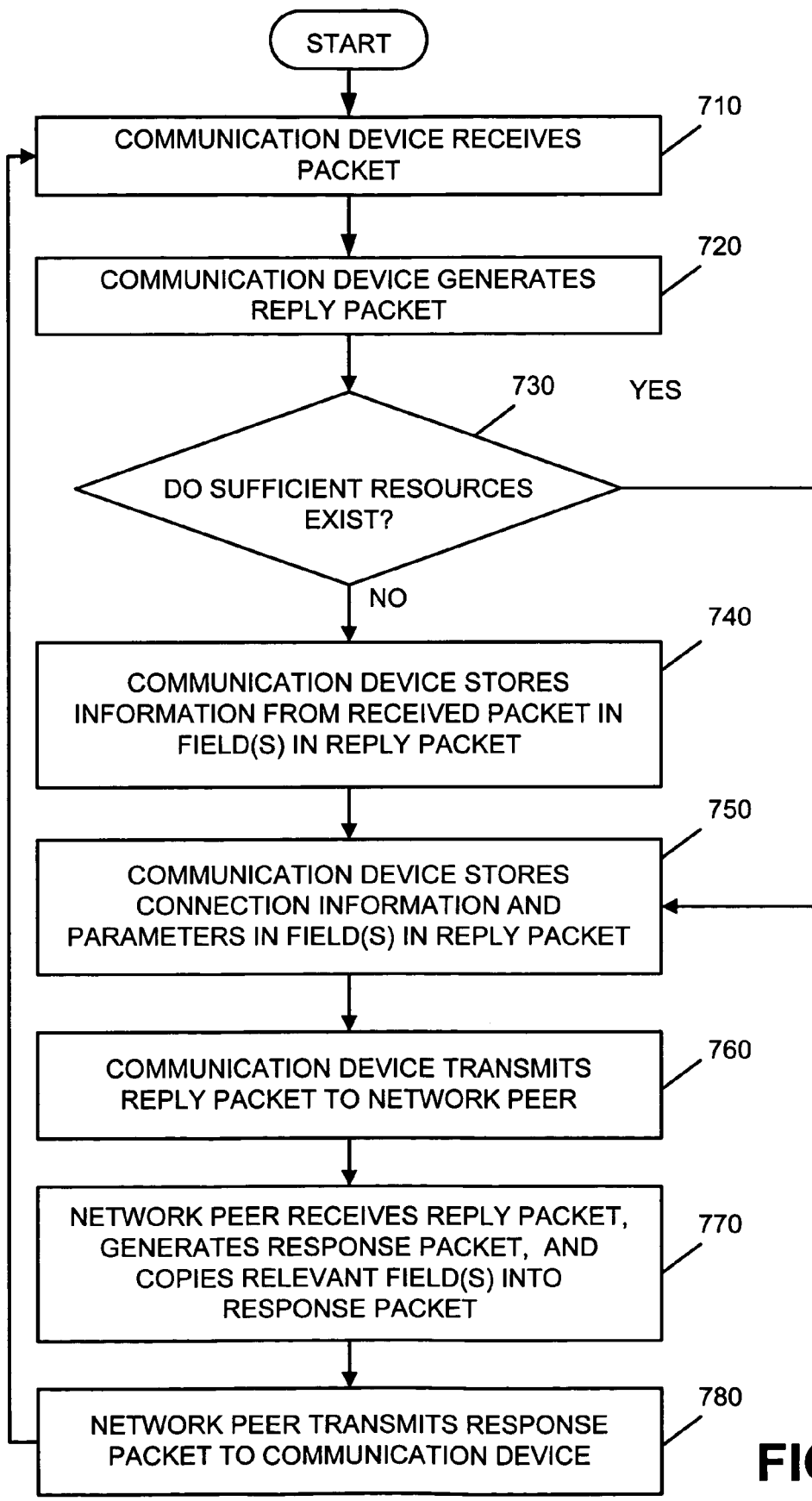
FIG. 7 illustrates an exemplary process, according to an alternative implementation of the present invention, that allows for operation of a communication device having limited memory.

FIG. 7 illustrates an exemplary process, according to an alternative implementation of the present invention, that allows a communication device having limited memory resources to participate in network operations. Processing begins with a communication device, such as communication device 110 in FIG. 1, receiving a packet via network 130 [step 710]. The packet may be received from a network peer, such as network peer 120 in FIG. 1, or another communication device 110. As described above, the communication device 110, in an implementation consistent with the present invention, may have very limited memory resources. As a result, the communication device 110 may be incapable of receiving an entire packet, or a significant portion of such a packet, into its memory 230 prior to analyzing and replying to the packet in accordance with the communication protocols implemented by the communication device 110.

Upon receipt of the packet, the communication device 110 generates a reply packet [step 720]. The communication device 110 then determines whether adequate resources exist [step 730]. In making such a determination, the communication device 110 determines whether information, such as data and/or control information, in the packet can and should be stored at this time and whether the information can and should be processed at this time. The communication device 110 may determine that the information can not be stored at the present time if, for example, the communication device 110 currently lacks the memory capacity to store all or a portion of the information. The communication device 110 may determine that the information should not be stored at the present time if, for example, the information is not currently needed by the communication device 110, but will be needed at a later time.

In determining whether the information can and should be processed at the present time, the communication device 110 may determine whether all or a portion of the information can be processed immediately. For example, the communication device 110 may determine whether its processor 220 is currently performing other tasks that may not allow for the information to be processed at the current time. The communication device 110 may also determine whether the information should be processed immediately or whether the information should be processed at a later time due, for example, to higher priority tasks currently being performed by the processor 220.

If the communication device 110 determines that adequate resources do not exist (i.e., that the information can not or should not be stored or that the information can not or should not be processed immediately), the communication device 110 may store the information from the received packet or other information in the communication device 110 that is not needed at the current time in the reply packet [step 740].

The communication device 110 may also store, whether or not adequate resources are determined to exist [step 730], connection information in the reply packet [step 750]. The connection information may include, for example, connection details and/or other control information that pertain to one or more network connections, virtual circuits, or sockets with which the communication device 110 is currently involved. Storing the connection information in the reply packet, even in those instances where adequate resources exist for processing the packet and the information contained therein, allows for implementation of a smaller memory in the communication device 110.

The communication device 110 may store the information anywhere in the packet that would not interfere with the normal processing of the packet and would allow for the later retransmission of the information from the network peer 120 to the communication device 110. For example, assuming that the communication device 110 and network peer 120 communicate using the Transmission Control Protocol, the communication device 110 may store the information in the timestamp field of the Transmission Control Protocol header of the generated packet. It will be appreciated that while the following description assumes the use of the Transmission Control Protocol, other communication protocols may alternatively be used.

If adequate resources are determined to exist in step 730, the communication device 110 may process the packet and the information stored therein. Once the packet has been generated and the connection and other information has been stored in the packet, the communication device 110 transmits the reply packet to a network peer, such as network peer 120 in FIG. 1 [step 760]. This network peer 120 may be the network peer 120 that transmitted the packet that was received in step 710 or it may be another network peer 120.

The network peer 120 receives the packet over network 130 [step 760]. Following the Transmission Control Protocol, the network peer 120 generates a response packet and copies the information from the timestamp field into a timestamp field of the response packet for transmission back to the communication device 110. It will be appreciated that if the communication device 110 stores the information in a field other than the timestamp field, the network peer 120 may manipulate the information when copying it to the response packet. If this occurs, the communication device 110 must know of the manipulation performed by the network peer 120 in order to convert the information back to its original form or to another usable form.

The network peer 120 transmits the response packet to the communication device 110 [step 770]. Upon receipt, the communication device returns to step 710 and processing repeats.

Figure 8:
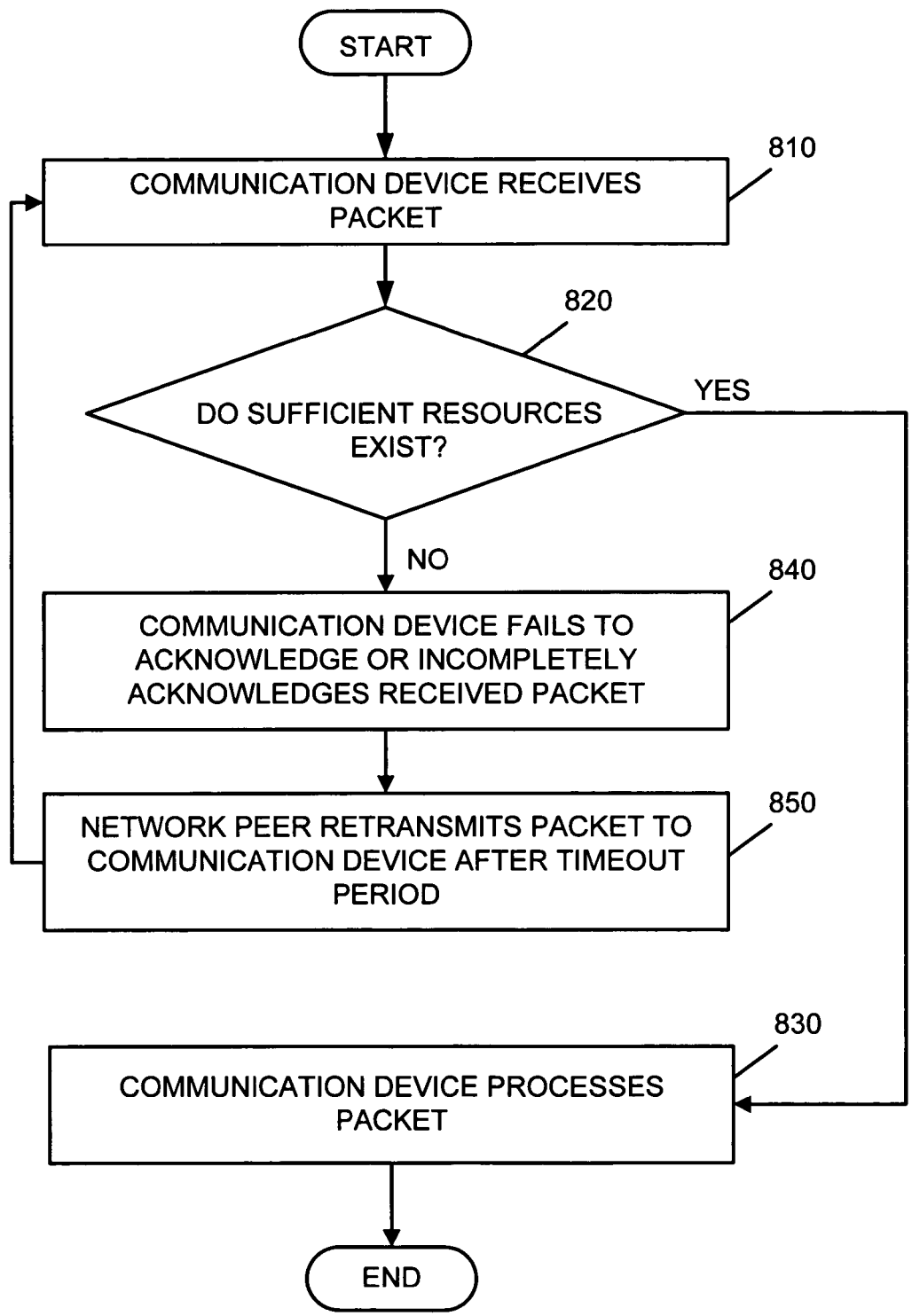
FIG. 8 illustrates an exemplary process, according to another alternative implementation of the present invention, that allows for operation of a communication device having limited memory resources.

FIG. 8 illustrates an exemplary process, according to another alternative implementation of the present invention, that allows a communication device having limited memory resources to participate in network operations. Processing begins with a communication device, such as communication device 110 in FIG. 1, receiving a packet via network 130 [step 810]. The packet may be received from a network peer, such as network peer 120. As described above, the communication device 110, in an implementation consistent with the present invention, may have very limited memory resources. As a result, the communication device 110 may be incapable of receiving or unwilling to receive an entire packet, or a significant portion of such a packet, into its memory 230 prior to analyzing and replying to the packet in accordance with the communication protocols implemented by the communication device 110.

Upon receipt of the packet, the communication device 110 determines whether adequate resources exist [step 820]. In making such a determination, the communication device 110 determines whether the packet can and should be stored at this time and whether the packet can and should be processed at this time. The communication device 110 may determine that the packet can not be stored at the present time if, for example, the communication device 110 currently lacks the memory capacity to store all or a portion of the packet. The communication device 110 may determine that the packet should not be stored at the present time if, for example, the information in the packet is not currently needed by the communication device 110, but will be needed at a later time.

In determining whether the packet can and should be processed at the present time, the communication device 110 may determine whether all or a portion of the packet can be processed immediately. For example, the communication device 110 may determine whether its processor 220 is currently performing other tasks that may not allow for all or a portion of the packet to be processed at the current time. The communication device 110 may also determine whether the packet should be processed immediately or whether all or a portion of the packet should be processed at a later time due, for example, to higher priority tasks currently being performed by the processor 220.

If the communication device 110 determines that the packet can and should be stored and that the packet can and should be processed immediately, the communication device 110 processes the packet [step 830]. The processing may include the processor 220 using data and/or control information in the packet for performing one or more tasks.

If the communication device 110 determines that adequate resources do not exist, the communication device 110 does not acknowledge or incompletely acknowledges the received packet [step 840]. By not acknowledging or incompletely acknowledging the received packet, the communication device 110 causes the network peer 120 to believe that the communication device 110 did not receive the entire packet. As a result, the network peer 120 will automatically retransmit the packet to the communication device 110 after a predetermined timeout period expires. Similar to the process described above with respect to FIG. 4, the communication device 110 can have data that is needed at a later time or that can not be processed immediately made available at a later time.

After a predetermined timeout period expires, the network peer 120, having not received an acknowledgement to the transmitted packet, retransmits the packet to the communication device 110 [step 850]. Upon receipt, the communication device 110 returns to step 710 and processing repeats until the communication device 110 determines that sufficient resources exist [step 820]. It will be appreciated that typical communication protocols may not allow this technique to continue indefinitely. The network peer 120 may only retransmit an unacknowledged packet a predetermined number of times before determining that the transmission has failed.

When the communication device 110 determines that sufficient resources exist [step 820], the communication device 110 processes the packet [step 830].

CONCLUSION

Systems and methods consistent with the present invention provide a mechanism by which a device with a limited memory capacity may participate in a communication network. The device uses fields in packets to store data and/or control information that is not needed by the device at the current time. The device stores the data and/or control information in one or more fields of the packets with knowledge of how the data and/or control information will be manipulated (if at all) by the network peer to which the packets are transmitted. When response packets are returned by the network peer, the device processes the data and/or control information if received at a time when the data and/or control information is needed. By transmitting data and/or control information to a network peer until needed, the device, in essence, uses the packets and network peer as a virtual memory.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while a series of steps have been shown with respect to FIGS. 4, 7, and 8, the order of the steps may vary in other implementations consistent with the present invention. No step or element is critical to the present invention unless specifically indicated as such in the above description. For example, while the flowchart in FIG. 4 indicates that the process operates in response to receiving a packet, implementations consistent with the present invention are not so limited. In fact, any time that the communication device determines that data and/or control information is not currently needed, the communication device may use its virtual memory by transferring the data and/or control information to a network peer in order to have that data and/or control information later returned by that network peer.

The scope of the invention is defined by the following claims and their equivalents.

What is claimed is:

1. A method for processing information in a communication network having first and second communication devices, comprising:
   receiving a first packet by the first communication device, the first packet containing information for processing by the first communication device;

determining whether adequate resources exist for the first communication device to process or store the information for processing;

when adequate resources are determined not to exist, storing the information for processing in a virtual memory by including the information for processing in one or more fields of a second packet that are otherwise unrelated to the information for processing;

transmitting the second packet to a second communication device;

transferring, via the second communication device, the information for processing to one or more fields of a third packet that are otherwise unrelated to the information for processing; and transmitting the third packet to the first communication device to return the information for processing to the first communication device.

2. The method of claim 1 further comprising:
processing or storing the information in the third packet by the first communication device.

3. The method of claim 1 wherein the determining whether adequate resources exist for storing the first packet includes:
determining whether the first packet can be stored, and
determining whether the first packet should be stored.

4. The method of claim 1 wherein the storing of information in the second packet includes:
storing other information in the second packet in addition to the information from the first packet.

5. The method of claim 4 wherein the determining whether adequate resources exist for processing the first packet includes:
determining whether the first packet can be processed immediately,
determining whether the first packet should be processed immediately.

6. The method of claim 1 further comprising:
generating the second packet by the first communication device, the second packet having a timestamp field.

7. A method for processing information in a communication network having first and second communication devices, comprising:
receiving a first packet by the first communication device, the first packet containing information for processing by the first communication device;
determining whether adequate resources exist for the first communication device to process or store the information for processing;
when inadequate resources are determined to exist, storing the information for processing in a virtual memory by
generating a second packet and storing the information from the first packet in the timestamp field of the second packet;
transmitting the second packet to a second communication device;
transferring, via the second communication device, the information for processing to one or more fields of a third packet; and
transmitting the third packet to the first communication device to return the information for processing to the first communication device.

8. The method of claim 1 further including in the step of transferring:
manipulating the information prior to transferring the information to the third packet.

9. The method of claim 8 further including in the step of providing the information:
converting the information transferred to the third packet back to its original form prior to processing or storing the information by the first communication device.

10. The method of claim 1 wherein the information includes data.

11. The method of claim 4 wherein the other information includes control information.

12. The method of claim 11 wherein the control information includes information relating to one or more network connections, virtual circuits, or sockets.

13. The method of claim 1 further comprising:
storing, prior to transmitting the second packet, connection information in one or more fields of the second packet when adequate resources are determined not to exist.

14. A network comprising:
a first communication device configured to receive a first packet, the first packet containing information for processing by the first communication device, determine whether adequate resources exist for the first communication device to process or store the information for processing, operate with a virtual memory when adequate resources are determined not to exist by generating a second packet and storing the information for processing in one or more fields of the second packet that are otherwise unrelated to the information for processing, transmitting the second packet to a second communication device, receiving from the second communication device a third packet that contains the information for processing in one or more fields of the packet, and processing or storing the information for processing; and
a second communication device configured to receive the second packet, generate the third packet, transfer the information for processing to one or more fields of the third packet that are otherwise unrelated to the information for processing, and transmit the third packet to the first communication device.

15. The network of claim 14 wherein, when determining whether adequate resources exist for storing the information, the first communication device is configured to:
determine whether the information can be stored, and
determine whether the information should be stored.

16. The network of claim 14 wherein, when storing the information in the second packet, the first communication device is configured to:
further store other information in the second packet.

17. The network of claim 14 wherein, when determining whether adequate resources exist for processing the information, the first communication device is configured to:
determine whether the information can be processed, and
determine whether the information should be processed.

18. A network comprising:
a first communication device configured to receive a first packet, the first packet containing information for processing by the first communication device, determine whether adequate resources exist for the first communication device to process or store the information for processing, operate with a virtual memory when inadequate resources are determined to exist by generating a second packet and storing the information from the first packet in a timestamp field of the second packet, transmitting the second packet to a second communication device, receiving from the second communication device a third packet that contains the information to be processed in one or more fields of the packet, and processing or storing the information to be processed; and a second communication device configured to receive the second packet, generate the third packet, transfer the information to be processed to one or more fields of the third packet, and transmit the third packet to the first communication device.

19. The network of claim 14 wherein the second communication device is further configured to:
manipulate the information prior to transferring the information to the third packet.

20. The network of claim 19 wherein the first communication device is further configured to:
convert the transferred information back to its original form prior to processing or storing.

21. The network of claim 14 wherein the first communication device has limited memory resources and the second communication device is a network peer.

22. The network of claim 14 wherein the information includes data.

23. The network of claim 16 wherein the other information includes control information.

24. The network of claim 23 wherein the control information includes information relating to one or more network connections, virtual circuits, or sockets.

25. The network of claim 14 wherein the first communication device is implemented in logic.

26. The network of claim 14 wherein the first and second communication devices are implemented in logic.

27. A system for processing information, comprising:
means for receiving a first packet, the first packet containing information to be processed by a first communication device;
means for determining whether adequate resources exist for storing the information;
means for placing, when adequate resources are determined not to exist, the information from the first packet in a virtual memory by
including the information from the first packet in one or more fields of a second packet that are otherwise unrelated to the information for processing, transmitting the second packet from the first communication device to a second communication device;
transferring the information to one or more fields of a third packet that are otherwise unrelated to the information for processing; and
transmitting the third packet from the second communication device to the first communication device; and
means for processing the information in the third packet by the first communication device.

28. A communication device comprising:
a memory configured to store instructions; and
a processor configured to execute the instructions to receive a first packet containing information for processing by the communication device, determine whether to store the information for processing in the memory, when the information is not to be stored generate a second packet having a plurality of fields with one or more fields acting as a virtual memory and store the information for processing from the first packet in at least one of the fields of the second packet that are otherwise unrelated to the information for processing, transmit the second packet, receive, in response to transmitting the second packet, a third packet that contains in one or more fields of the packet the information for processing, and process or store the information from the third packet.

29. The communication device of claim 28 wherein, when determining, the processor is configured to:
determine whether the memory is capable of storing the information.

30. The communication device of claim 28 wherein, when determining, the processor is configured to:
determine whether the information should be stored in the memory.

31. The communication device of claim 28 wherein the processor is further configured to:
determine, in response to receiving the first packet, whether adequate resources exist for immediately processing the information, and generate the second packet when adequate resources do not then exist.

32. The communication device of claim 31 wherein the processor is further configured to:
convert, the transferred information in the third packet back to its original form prior to processing or storing if the information has been manipulated prior to the transfer of the information to the third packet.

33. The communication device of claim 28 wherein the information includes data.

34. The communication device of claim 28 further storing other information in the second packet, wherein the other information includes control information.

35. The communication device of claim 34 wherein the control information pertains to one or more connections, virtual circuits, or sockets.

36. A communication device comprising:
a memory configured to store instructions; and
a processor configured to execute the instructions to receive a first packet containing information for processing by the communication device, determine whether to store the information for processing in the memory, when the information is not to be stored generate a second packet having a plurality of fields with one or more fields acting as a virtual memory and store the information in at least a timestamp field of the second packet, transmit the second packet, receive, in response to transmitting the second packet, a third packet that contains in one or more fields of the packet the information for processing, and process or store the information from the third packet.

37. The communication device of claim 28 wherein, prior to processing, the processor is configured to:
repeat the determining, generating, storing, transmitting, and receiving the third packet until the communication device is ready to process the information.

38. A computer-readable medium containing instructions for controlling at least one processor of a communication device to perform a method for processing information, the method comprising:
receiving a first packet containing information for processing by the communication device;
determining whether to store the information;
generating a second packet when the information is not to be stored, the second packet having a plurality of fields with one or more of the fields acting as a virtual memory for the information for processing, the information for processing being otherwise unrelated to the one or more fields of the second packet;
transferring the information for processing from the first packet to the one or more fields of the second packet that act as a virtual memory;
transmitting the second packet to a second communication device;

receiving from the second communication device a third packet containing the information for processing, the information for processing being included in one or more fields of the third packet that act as a virtual memory, the information for processing being otherwise unrelated to the one or more fields of the third packet; and storing or processing the information retrieved from the one or more fields of the third packet.

39. The computer-readable medium of claim 38 wherein the determining includes:

determining whether the communication device is capable of storing the information.

40. The computer-readable medium of claim 38 wherein the determining includes:

determining whether the communication device should store the information.

41. The computer-readable medium of claim 38 wherein the method further includes:

determining, in response to receiving the first packet, whether adequate resources exist for immediately processing the information; and if adequate resources do not exist generating the second packet.

42. The computer-readable medium of claim 41 wherein the method further includes:

converting the transferred information in the third packet back to its original form prior to processing or storing if the information has been manipulated prior to the transfer of the information to the third packet.

43. The computer-readable medium of claim 38 the information includes data.

44. The computer-readable medium of claim 38 wherein other information is included in the second packet, the other information including control information.

45. The computer-readable medium of claim 44 wherein the control information pertains to one or more connections, virtual circuits, or sockets.

46. A computer-readable medium containing instructions for controlling at least one processor of a communication device to perform a method for processing information, the method comprising:

receiving a first packet containing information for processing by the communication device;

determining whether to store the information;

generating a second packet when the information is not to be stored, the second packet having a plurality of fields with one or more of the fields acting as a virtual memory for the information for processing;

transferring the information for processing from the first packet to the one or more fields of the second packet that act as a virtual memory;

transmitting the second packet to a second communication device;

receiving from the second communication device a third packet containing the information for processing, the information for processing being included in one or more fields of the third packet that act as a virtual memory, the third packet being otherwise unrelated to the first packet; and storing or processing the information retrieved from the one or more fields of the third packet transferring the information from the first packet to a timestamp field of the second packet.

47. A method for processing information in a network having a first communication device and a second communication device, the method, being performed by the first communication device, comprising:

receiving one or more first packets, each of the first packets containing information for processing by the first communication device;

determining, for each of the one or more first packets, whether to store the information for processing;

generating, for each of the one or more first packets, a second packet when the information for processing is not to be stored, the second packet having a plurality of fields with one or more of the fields acting as a virtual memory for the information for processing, the information for processing being otherwise unrelated to the one or more fields;

transferring the information for processing from each of the first packets to at least one field that is acting as a virtual memory of the corresponding second packet;

transmitting each second packet to the second communication device;

receiving from the second communication device for each second packet transmitted, respective third packets that correspond to the transmitted second packets, the respective third packets containing in one or more fields that act as a virtual memory the information for processing from the corresponding second packets the information for processing being otherwise unrelated to the one or more fields; and processing or storing the information in the respective third packets.

48. The method of claim 47 wherein the determining includes;

determining, for each of the one or more first packets, whether the first communication device is capable of storing the information.

49. The method of claim 47 wherein the determining includes:

determining, for each of the one or more first packets, whether the first communication device should store the information.

50. The method of claim 47 wherein the method further includes:

determining, for each of the one or more first packets, whether adequate resources exist for immediately processing the information.

51. The method of claim 47 wherein the step of transferring information to the third packet further includes:

manipulating the information prior to the transfer of the information to at least one of the third packets.

52. The method of claim 50 wherein the step of processing the information further includes:

for any of the one or more third packets in which the transferred information was manipulated prior to the transfer of the information, converting the transferred information back to its original form.

53. A communication device comprising:

a memory configured to store instructions; and a processor configured to execute the instructions to determine whether information is needed at a current time, generate a packet having a plurality of fields when the information is not needed at the current time, store the information in at least one field of the packet that acts as a virtual memory for the information, the field being otherwise unrelated to the information, transmit the packet to a second communication device, receive a different packet from the second communication device, the different packet containing the information in at least one field that acts as a virtual memory for the information, and process the information in the different packet when the information is determined to be needed.

54. A communication device comprising:
a memory configured to store instructions; and
a processor configured to execute the instructions to determine whether information is needed at a current time, generate a packet having a plurality of fields when the information is not needed at the current time, store the information in at least a timestamp field of the packet, transmit the packet to a second communication device, receive a different packet from the second communication device, the different packet containing the information, and process the information in the different packet when the information is determined to be needed.

55. A method for processing information in a communication network having a plurality of communication devices, comprising:
receiving a first packet by a first of the plurality of communication devices;
storing by the first communication device information relating to a network connection between the first communication device and a second of the plurality of communication devices, the first communication device including the network connection information in one or more fields of a second packet that act as a virtual memory, the information being otherwise unrelated to the one or more fields;
transmitting the second packet to the second communication device;
transferring the network connection information from the second packet to one or more fields of a third packet that act as a virtual memory for the information, the information being otherwise unrelated to the one or more fields;
transmitting the third packet to the first communication device; and
processing the third packet.

* * * * *